United States Patent [19]

Scholl

[11] 4,259,511

[45] Mar. 31, 1981

[54] PROCESS FOR SEPARATING SELENIUM, SELENIUM COMPOUNDS, SULFUR AND/OR SULFUR COMPOUNDS FROM POLYURETHANES CONTAINING THESE ELEMENTS AND/OR COMPOUNDS

[75] Inventor: Hans-Joachim Scholl, Cologne, Fed. Rep. of Germany

[73] Assignee: Bayer Aktiengesellschaft, Leverkusen, Fed. Rep. of Germany

[21] Appl. No.: 115,577

[22] Filed: Jan. 25, 1980

[30] Foreign Application Priority Data

Feb. 9, 1979 [DE] Fed. Rep. of Germany ........ 2904929

[51] Int. Cl.³ .......................................... C07C 125/073
[52] U.S. Cl. ............................... 560/25; 560/24; 560/115; 560/157; 560/158; 423/508; 423/509; 423/510; 423/511; 423/567 R
[58] Field of Search ............... 560/24, 25, 115, 157, 560/158; 423/508, 509, 510, 567 R, 511

[56] References Cited

U.S. PATENT DOCUMENTS

| 3,895,054 | 7/1975 | Zajocek et al. | 560/25 |
|---|---|---|---|
| 3,956,360 | 5/1976 | Zajocek et al. | 560/25 |
| 4,038,375 | 7/1977 | Vorachek et al. | 423/510 |
| 4,038,376 | 7/1977 | McCoy et al. | 423/510 |
| 4,038,377 | 7/1977 | Washall et al. | 423/510 |
| 4,041,139 | 8/1977 | Washall et al. | 423/508 |
| 4,055,629 | 10/1977 | Rosenthal et al. | 423/509 |
| 4,055,630 | 10/1977 | McCoy et al. | 423/509 |
| 4,130,633 | 12/1978 | Shawl et al. | 560/25 |

FOREIGN PATENT DOCUMENTS

| 2808980 | 9/1979 | Fed. Rep. of Germany . |
| 2808990 | 9/1979 | Fed. Rep. of Germany . |
| 1485108 | 9/1977 | United Kingdom . |
| 1486399 | 9/1977 | United Kingdom . |

*Primary Examiner*—Natalie Trousof
*Assistant Examiner*—G. T. Breitenstein
*Attorney, Agent, or Firm*—Gene Harsh; Joseph C. Gil

[57] ABSTRACT

A process for separating selenium, selenium compounds, sulfur and/or sulfur compounds from urethanes containing these elements and/or compounds by reacting said urethanes with an aqueous permanganate solution and then separating the resulting phase system.

3 Claims, No Drawings

PROCESS FOR SEPARATING SELENIUM, SELENIUM COMPOUNDS, SULFUR AND/OR SULFUR COMPOUNDS FROM POLYURETHANES CONTAINING THESE ELEMENTS AND/OR COMPOUNDS

FIELD OF THE INVENTION

The present invention relates to a new process for separating selenium, selenium compounds, sulfur and/or sulfur compounds from urethanes containing these elements and compounds of the type produced, for example, during the synthesis of urethane from organic nitro compounds using the said elements and compounds as catalysts or co-catalysts.

BACKGROUND OF THE INVENTION

Selenium and/or inorganic and organic selenium compounds are valuable catalysts or co-catalysts in the production of urethanes, for example from organic nitro compounds, carbon monoxide and organic hydroxyl compounds (cf., for example, U.S. Pat. Nos. 3,895,054 and 3,956,360; British Pat. No. 1,485,108 and 1,486,399; German Patent Applications P 28 08 980.7, P 28 08 990.9 and P 28 38 754.4).

The urethanes produced during these synthesis processes often contain traces of selenium which may be present in the form of elementary selenium or in the form of inorganic or organic selenium compounds. In particular, the combination of selenium with organic compounds in the above-mentioned processes often lead to the formation of organic selenium compounds or other soluble selenium compounds which remain in solution together with the urethane formed during the reaction and consequently contaminate the urethane during removal of the organic hydroxyl compounds commonly used as solvents.

Due to the toxicity and the cost of selenium, it is necessary to separate the selenium materials from the urethanes formed. In doing this, it is necessary to isolate the separated selenium compounds in a form which is suitable for re-use as a catalyst.

There has, therefore, been many attempts to provide processes for purifying selenium-containing urethanes. For example, U.S. Pat. Nos. 4,038,375; 4,038,376; 4,038,377; 4,041,139; 4,055,629; and 4,055,630 wherein purification has been carried out by means of liquid-liquid extraction or by means of metal oxides and metal salts such as mercury compounds. The selenium is generally only partially removed by these processes, even when adopting complicated modes of operation and using toxicologically critical substances. Progress has been made by the process described in U.S. Pat. No. 4,130,633 wherein aqueous hydrogen peroxide solutions are used to remove the selenium or selenium compounds. In this method it is unnecessary to use toxicologically critical substances such as mercury compounds. The process according to U.S. Pat. No. 4,130,633 is, however, also accompanied by serious drawbacks because the urethanes produced in this way are unsuitable for commercial use due to their high residual content of selenium and because the additional step of separating any hydrogen peroxide remaining in the urethane solution is a process which is itself not free from difficulties.

The object of the present invention was therefore to provide an improved process for purifying selenium-containing urethanes in which the selenium content in the polyurethane can be drastically reduced in a simple manner and in which the formation of hydrogen peroxide-containing urethanes or urethane solutions is avoided.

This object could surprisingly be achieved by means of the process according to the present invention wherein the above-mentioned drawbacks are substantially overcome.

It has also surprisingly been found that the method according to the present invention is also eminently suitable for removing sulfur or sulfur compounds from urethanes.

BRIEF DESCRIPTION OF THE INVENTION

The present invention relates to a process for separating selenium, selenium compounds, sulfur and/or sulfur compounds from urethanes. These urethanes are thoroughly mixed with an aqueous permanganate solution having a concentration of from 0.1 to 100%, by weight, based on the amount of polyurethanes at a temperature of from 20° to 110° C. The urethanes are preferably in the form of a melt, a liquid, or a solution of an inert solvent immiscible in water. The urethanes, separated from the selenium, selenium compounds, sulfur and/or sulfur compounds, are isolated from the resulting organic phase. The aqueous and solid phases contain the permanganate and the selenium, selenium compounds, sulfur and/or sulfur compounds.

The urethanes used according to the present invention may be produced, for example, from a selenium or sulfur-catalyzed reaction of an organic, preferably aromatic nitro compound, with carbon monoxide and an organic hydroxyl compound, such as ethanol or methanol. The manner in which the crude urethane products are worked up when carrying out the present process depends on the physical properties of the respective urethane. Thus, urethanes which are liquid at room temperature or urethanes which can be melted without decomposition by heating to a temperature of 110° C., such as O-methyl-N-phenyl-urethane or O-ethyl-N-phenyl-urethane, can be used as a liquid or melt. In contrast, when urethanes are used which melt above 110° C., such as 2,4-bis-(ethoxycarbonylamino)-toluene or 2,4-bis-(methoxycarbonylamino)-toluene, they are used as solutions dissolved in inert solvents such as toluene, the isomeric xylenes or chlorobenzene. In addition, urethanes which cannot be distilled without decomposition, such as 2,4-bis-(ethoxycarbonylamino)-toluene and 2,4-bis-(methoxycarbonylamino)-toluene, are preferably separated from the crude alcoholic solution by crystallization after the insoluble constituents have been removed. The remaining urethane containing colloidal selenium and/or soluble selenium compounds or sulfur and/or compounds is then preferably dissolved in an inert solvent. The solution is then freed from any constituents which might precipitate, such as bases or salts used during synthesis, by filtration. The resulting solution is then used in the instant process. Urethanes which melt without decomposition below 110° C., but which cannot be distilled without decomposition, are preferably treated using a solvent in the present invention.

Urethanes which can be distilled without decomposition and which are liquid at room temperature or which can be melted without decomposition by heating to a maximum of 110° C. can be used in the present invention prior to their purification by distillation.

When solvents are used, solutions containing 5 to 50%, by weight, of the urethanes are generally utilized.

Any aqueous permanganate solutions can be used in the instant process. Aqueous potassium permanganate solutions are preferred. Particularly preferred are aqueous potassium permanganate solutions with permanganate concentrations of from 1 to 10% by weight. These aqueous permanganate solutions are used in a quantity of from 0.1 to 100%, by weight, preferably from 1 to 25%, by weight, for separating off selenium and in a quantity of from 1 to 100%, preferably from 10 to 60%, by weight, for separating off sulfur, all percents based on the weight of the urethane to be purified.

The urethanes to be treated in the instant invention generally contain from 0.01 to 2%, by weight, of free selenium and/or of bound selenium in the form of selenium compounds of essentially unknown constitution and/or from 0.1 to 20%, by weight, of free sulfur and/or bound sulfur in the form of sulfur compounds of essentially unknown constitution.

Preferably, the quantity of permanganate should, if possible, be calculated in such a way that from 1 to 10 mols of permanganate are available for each mol of the elements and/or compounds to be removed.

The process of the instant invention is carried out at a temperature of from 20° and 110° C., preferably from 50° and 100° C. by thoroughly mixing the urethane to be purified with the aqueous permanganate solution for a period of from about 1 minute to 2 hours, preferably from 5 to 60 minutes. The thorough mixing is advantageously performed by using suitable mixer units which ensure intimate, thorough mixing of the inorganic and organic phases which are immiscible. Suitable additives having a large surface area such as activated carbon, aluminum oxide, silicon dioxide, zeolite or similar materials can additionally be used to accelerate the purification process.

Once the urethane or urethane solution has been mixed thoroughly with the aqueous permanganate solution, there are usually three phases present. The aqueous and solid phases produced contain the selenium and/or sulfur removed from the urethane. These two phases can be worked up using conventional processes for re-obtaining the selenium and/or sulfur. The organic phase, i.e., the essentially sulfur-free and/or selenium-free urethane or its solution can be worked up further by crystallization or distillation.

The following examples serve as a further illustration of the process according to the present invention without in any way restricting it. The data concerning the purity of the urethanes and urethane solutions given in the examples have each been calculated from the results of gas chromatography and liquid chromatography. The quantities of selenium have been determined by the method of atomic absorption spectroscopy. The quantities of sulfur have been determined by the Grote-Krekeler method. All urethanes mentioned in the examples have been prepared in known manner from the corresponding nitrocompounds, carbonmonoxide and the corresponding alcohols using selenium or sulfur as catalyst.

EXAMPLE 1

2,4-bis-(ethoxycarbonylamino)-toluene prepared in known manner from 2,4-dinitrotoluene, carbon monoxide and ethanol in the presence of selenium as catalyst was dissolved in hot o-xylene to form a 10%, by weight, solution. 1000 g of this xylene solution were then shaken with 300 ml of a 2%, by weight, caustic soda solution and washed neutral with water. After separation of the aqueous phase, the selenium-containing urethane was obtained from the organic phase by crystallization.

Melting point: 128°–130° C., selenium content: 0.031% by weight.

10 g of the urethane which had previously been treated in this way were dissolved in 60 g o-xylene. The solution is heated to 80° C. and mixed with 2 g of a 2%, by weight, aqueous potassium permanganate solution. The mixture was stirred intensely for 30 minutes at 80° C. The hot organic phase was then separated from the solid and aqueous constituents. The organic phase was concentrated by distilling off a proportion of the xylene to half of its original volume, and the purified 2,4-bis-(ethoxycarbonylamino)-toluene was obtained in a virtually quantitative yield from the concentrated solution by crystallization.

Melting point: 131°–132° C., selenium content: 0.0045% by weight.

Comparison Example to Example 1

When adopting the same mode of operation as described in Example 1, but using 2 g of a 2%, by weight, aqueous hydrogen peroxide solution instead of the permanganate solution, 2,4-bis-(ethoxycarbonylamino)-toluene having a melting point of 130° to 131° C. and a selenium content of 0.011%, by weight, is obtained.

EXAMPLE 2

A selenium-containing solution of [O]-ethyl-N-phenyl-urethane in ethanol, which was contaminated with small proportions of aniline, inorganic base and soluble metal compounds, was freed from low boiling fractions under reduced pressure. The residue was dissolved in hot toluene to form a 30%, by weight, solution. 300 g of the resultant toluene solution were shaken with 100 ml of a 2%, by weight, caustic soda solution and washed neutral with water. After separation of the aqueous phase, the toluene was distilled off and the urethane distilled at a temperature of from 90° to 94° C. and at a pressure of 0.2 mbar. The urethane was produced in a purity of 98% by weight. The selenium content was 0.03% by weight.

30 g of the urethane which had previously been treated in this way were melted and mixed with 5 g of a 4%, by weight, potassium permanganate solution at 70° C. After intensive stirring for 15 minutes at 70° C., the hot organic phase was separated from the solid and aqueous constituents and distilled. [O]-ethyl-N-phenyl-urethane having a purity of about 99% by weight and a selenium content of 0.004%, by weight, was obtained in a virtually quantitative yield.

Comparison Example to Example 2

Example 1 was repeated using 5 g of 4%, by weight, aqueous hydrogen peroxide solution instead of the potassium permanganate solution. A crude urethane in which peroxide could be detected by a qualitative test (yellowish brown coloration of a potassium iodide solution in acetic acid) was obtained after separating off the aqueous constituents. As a precautionary measure, redistillation was not carried out. In urethanes which have been treated with potassium permanganate solution no peroxide can be detected.

EXAMPLE 3

An [O]-ethyl-N-phenyl-urethane having the following characteristic data was obtained in accordance with the method of Example 2.
Purity: 94.2% by weight
Selenium content: 0.083% by weight.

A 20 g sample was melted and mixed at 80° C. with 3 g of 4%, by weight, potassium permanganate solution. The mixture was stirred for 30 minutes at 80° C. and was worked up in accordance with Example 2. An [O]-ethyl-N-phenyl-urethane having the following characteristic data was obtained in a virtually quantitative yield:
Purity: 97.5% by weight.
Selenium content: 0.006% by weight.

EXAMPLE 4

A selenium-containing solution of [O]-methyl-N-phenyl-urethane in methanol was worked up in accordance with Example 2. A methyl-N-phenyl-urethane having the following characteristic data was obtained:
$K_{P0.2}$: 78° to 81° C.
Purity: 98% by weight.
Se-content: 0.043% by weight.

A 20 g sample was melted and mixed with 1 g of an active surface silicium dioxide (Celite 545 of Johns Mansville Sales Corp. New York) and 3 g of a 5%, by weight, potassium permanganate solution at 80° C. The mixture was stirred for 45 minutes at 80° C. and worked up in accordance with Example 2. An [O]-methyl-N-phenyl-urethane having the following characteristic data was obtained with virtually no loss:
Purity: 99% by weight.
Se-content: 0.005% by weight.

EXAMPLE 5

A selenium-containing solution in methanol of O-methyl-N-phenyl-urethane, prepared from nitrobenzene, carbonmonoxide and methanol in the presence of selenium as catalyst, which was contaminated with small proportions of aniline, inorganic base and dissolved metal compounds was freed from low-boiling fractions at reduced pressure. 70 g of residue were mixed with 150 g hot toluene. Precipitates were then filtered off and 65.5 g of crude methyl-N-phenyl-urethane having the following data was obtained after separating off the toluene:
Purity: 91%.
Se-content: 0.375% by weight.

A 40 g sample was mixed at 80° C. with 3 g Celite 545 and 7 g of a 6%, by weight, potassium permanganate solution. The mixture was stirred for 40 minutes at 80° C. and, after working it up in accordance with Example 2, [O]-methyl-N-phenyl-urethane having the following characteristic data was obtained in a virtually quantitative yield:
$K_{P0.2}$: 78°–80° C., purity: 97% by weight.
Se-content: 0.0085% by weight.

EXAMPLE 6

2,4-bis-(methoxycarbonylamino)-toluene prepared in known manner from 2,4-dinitrotoluene, carbonmonoxide and methanol in the presence of selenium as catalyst was isolated from a selenium-containing solution of 2,4-bis-(methoxycarbonylamino)-toluene in methanol by crystallization.

Melting point: 167°–169° C.
Purity: 95% by weight.
Se-content: 0.015% by weight.

A 20 g sample of this urethane was dissolved in 380 g chlorobenzene and mixed with 3 g of a 6%, by weight, aqueous potassium permanganate solution at 100° C. The mixture was stirred for 25 minutes at 100° C. 2,4-bis-(methoxycarbonylamino)-toluene was obtained in a virtually quantitative yield after working up the mixture following the method of Example 1, having a Melting point: 169°–170° C., purity 96% by weight, and Se-content: 0.0017% by weight.

EXAMPLE 7

A sulfur-containing solution of [O]-ethyl-N-phenyl-urethane in ethanol, which had been prepared in known manner from 2,4-dinitro-toluene, carbonmonoxide and ethanol in the presence of sulfur as catalyst and which was contaminated with small proportions of aniline, inorganic base and soluble metal compounds, was worked up following the method of Example 2. [O]-ethyl-N-phenyl-urethane having the following characteristic data was obtained:
$K_{P0.2}$: 89°–94° C.
Purity: 97% by weight.
Sulfur content: 0.37% by weight.

A 30 g sample was melted and reacted at 90° C. with 10 g of a 3% by weight potassium permanganate solution. The mixture was stirred for 30 minutes at 90° C. The hot organic phase was separated from the solid and aqueous constituents and distilled. [O]-ethyl-N-phenyl-urethane having a purity of 98%, by weight, and a sulfur content of 0.04%, by weight, was obtained in a virtually quantitative yield.

EXAMPLE 8

A sulfur-containing solution in methanol of O-methyl-N-phenyl-urethane obtained in known manner from nitrobenzene, carbonmonoxide and methanol in the presence of sulfur as catalyst and which was contaminated with small proportions of aniline, inorganic base and dissolved metal compounds was worked up as the urethane of example 5.

A crude [O]-methyl-N-phenyl-urethane having a purity of 92%, by weight, and a sulfur content of 1.23%, by weight, was obtained.

A 40 g sample was mixed at 70° C. with 5 g Celite 545 and 20 g of a 6%, by weight, potassium permanganate solution. After intensive stirring for 45 minutes at 70° C., the hot organic phase was separated from the solid and aqueous constituents and was distilled. [O]-methyl-N-phenyl-urethane having a purity of 96%, by weight, and a sulfur content of 0.035%, by weight, was obtained in a virtually quantitative yield.

What is claimed is:

1. A process for separating selenium, selenium compounds, sulfur and/or sulfur compounds from urethanes containing these elements and/or compounds comprising: mixing said urethanes with an aqueous permanganate solution at a concentration of from 0.1 to 100% by weight, based on the amount of said urethanes, at a temperature of from 20° to 110° C., thereby forming an aqueous phase and an organic phase and recovering purified urethane from the organic phase.

2. The process of claim 1, wherein said urethanes are in the form of a liquid, a melt or a solution in an inert solvent immiscible in water.

3. A process as claimed in claim 1, wherein a 1 to 10%, by weight, aqueous potassium permanganate solution is used as said aqueous permanganate solution.

* * * * *